United States Patent [19]

Shiraishi et al.

[11] Patent Number: 5,157,504
[45] Date of Patent: Oct. 20, 1992

[54] COPY CASSETTE SUPPLYING APPARATUS

[75] Inventors: Atsushi Shiraishi; Shinji Itoh, both of Kanagawa; Hideharu Oshima, Omiya, all of Japan

[73] Assignee: Fuji Photo Film Co., Ltd., Kanagawa, Japan

[21] Appl. No.: 685,790

[22] Filed: Apr. 16, 1991

[30] Foreign Application Priority Data

Apr. 20, 1990 [JP] Japan ................... 2-105675
Apr. 20, 1990 [JP] Japan ................... 2-105676
Apr. 20, 1990 [JP] Japan ................... 2-105677

[51] Int. Cl.⁵ ............... H04N 1/00; G03G 21/00; B65G 65/00; B65G 1/00
[52] U.S. Cl. ................... 358/296; 358/498; 355/308; 355/321; 414/331
[58] Field of Search ............ 358/296, 498; 355/308, 355/321; 414/331

[56] References Cited

U.S. PATENT DOCUMENTS

| 3,687,540 | 8/1972 | Hashimoto | 355/308 |
| 4,367,915 | 1/1983 | Georges | 414/331 X |
| 4,720,463 | 1/1988 | Farber et al. | 414/331 X |
| 4,932,828 | 6/1990 | Katae et al. | 414/331 X |
| 4,935,771 | 6/1990 | Ito | 355/321 X |
| 5,044,620 | 9/1991 | Ruch et al. | 414/331 X |

Primary Examiner—Benjamin R. Fuller
Assistant Examiner—Eric Frahm
Attorney, Agent, or Firm—Sughrue, Mion, Zinn, Macpeak & Seas

[57] ABSTRACT

A copy cassette supplying device supplies a copy cassette which holds a copy to be read, to an image reading device. The copy cassette supplying device includes a cassette holder having a vertical array of steps for holding copy cassettes thereon, the cassette holder being movable in a direction along the array of steps. The copy cassette supplying device also includes a cassette identifying unit for identifying copy cassettes to be carried on the steps, and a cassette supply unit for supplying copy cassettes held on the steps of the cassette holder to the image reading device.

20 Claims, 9 Drawing Sheets

COPY CASSETTE SUPPLYING APPARATUS

BACKGROUND OF THE INVENTION

1. Field of the Invention

The present invention relates to a copy cassette supply apparatus for automatically selecting and supplying a desired copy cassette, which holds a copy to be read, to an image reading apparatus.

2. Prior Art

Image scanning reading and reproducing systems are widely used in the printing and platemaking industries for electrically processing image information of originals or copies to produce original film plates with a view to simplifying the entire process and improving the quality of printed images.

The image scanning reading and reproducing systems have an image reading apparatus. In the image reading apparatus, an original or copy which is stored and positioned in a copy cassette is fed to an image reader, and then is two-dimensionally scanned to read image information therefrom.

More specifically, the copy cassette is first fed to the image reader, and the image information is preliminarily read from the copy in order to establish image processing conditions. Thereafter, the copy cassette is removed from the image reader, and the image processing conditions are established by the operator while the operator is viewing the copy in the copy cassette. After the image processing conditions have been established and entered, the copy cassette is manually inserted and then fed to the image reader again, and the image information is fully read from the copy according to the established image processing conditions.

Since the copy cassette is manually removed and inserted again in the above process, the operator may erroneously pick up another copy cassette and insert the wrong copy cassette into the image reading apparatus. If the wrong copy cassette is inserted in error, then the established image processing conditions are improper for the image information of the copy in the wrong copy cassette.

To eliminate the above drawback, it has been proposed to provide a cassette identifying means in the vicinity of a copy cassette insertion slot of the image reading apparatus. A copy cassette a it is inserted is identified by the cassette identifying means to prevent insertion of the wrong copy cassette.

However, whether an inserted copy cassette is a desired one or not can be recognized only when it reaches the cassette identifying means. Therefore, when the wrong copy cassette is detected by the cassette identifying means, the wrong copy cassette has to be removed, and a desired copy cassette has to be inserted again. Accordingly, it image information in the event of a cassette insertion error.

It has been desired to combine the image reading apparatus with an automatic copy cassette supplying apparatus which can automatically supply a plurality of copy cassettes in order to handle a large number of copies to be read. With such an automatic copy cassette supplying apparatus connected to the image reading apparatus, copy cassettes are successively supplied from the automatic copy cassette supplying apparatus to the image reading apparatus in the order in which the copy cassettes have been loaded into the automatic copy cassette supplying apparatus.

One problem with the conventional automatic copy cassette supplying apparatus is that any one of the copy cassettes, even if it requires immediate processing, cannot be fed to the image reading apparatus out of the sequence in which they have been loaded.

Moreover, in the event of a failure of the automatic copy cassette supplying apparatus, it can no longer supply any copy cassettes to the image reading apparatus. Even when the automatic copy cassette supplying apparatus operates normally, if a great number of copy cassettes are handled, then any desired copy cassette cannot quickly be supplied to the image reading apparatus.

SUMMARY OF THE INVENTION

It is an object of the present invention to provide a copy cassette supplying apparatus for supplying copy cassettes to an image reading apparatus, the copy cassette supplying apparatus having means for detecting the positions of stored copy cassettes to allow a desired copy cassette to be supplied in a short period of time.

Another object of the present invention is to provide a copy cassette supplying apparatus for supplying copy cassettes to an image reading apparatus, the copy cassette supplying apparatus being capable of supplying a desired copy cassette quickly while interrupting or overriding the supply process for other existing stored copy cassettes.

Still another object of the present invention is to provide a copy cassette supplying apparatus which can supply copy cassettes reliably and in a short period of time to an image reading apparatus even in the event of a failure of the copy cassette supplying apparatus.

According to the present invention, there is provided an apparatus for supplying a copy cassette which holds a copy to be read to an image reading apparatus, comprising a cassette holder having an array of steps for holding copy cassettes thereon, the cassette holder being movable in a direction along the array of steps, means for identifying copy cassettes to be carried on the steps, and means for supplying copy cassettes held on the steps of the cassette holder to the image reading apparatus.

The cassette holder comprises an actuator, at least one guide bar, and a cage operatively coupled to the actuator and movable along the guide bar in response to operation of the actuator, the steps being mounted in the cage. The actuator comprises a rotary actuator, a worm gear mechanism operatively coupled to the rotary actuator, and a chain connected between the worm gear mechanism and the cage. The cassette holder includes a plurality of guide rollers disposed between the steps, for guiding copy cassettes when the copy cassettes are moved onto and off the steps, the guide rollers being spaced in a direction in which the copy cassettes are moved onto and off the steps. The means for supplying copy cassettes comprises a support plate, and a cassette feed mechanism mounted on the support plate, for moving into the cassette holder to feed a copy cassette held in the cassette holder to the means for identifying copy cassettes and the image reading apparatus. The cassette feed mechanism comprises a rotary actuator, and a plurality of spaced drive rollers rotatable by the rotary actuator, for drivingly engaging sides of the copy cassette to feed the copy cassette to the means for identifying copy cassettes and the image reading apparatus. The cassette holder includes a plurality of guide rollers disposed between the steps, for guiding copy cassettes when the copy cassettes are moved onto and off the steps, the guide rollers being spaced in a direction in which the copy cassettes are moved onto and off the steps, the drive rollers being movable between adjacent ones of the guide rollers into driving engagement with the sides of the copy cassette. The cassette feed mechanism comprises a rotary actuator, a drive plate, a plurality of spaced drive rollers rotatably mounted on the drive plate and rotatable by the rotary actuator, for drivingly engaging sides of the copy cassette and feeding the copy cassette to the image reading apparatus, and a power transmitting member operatively coupled between the rotary actuator and the drive rollers. The drive plate is angularly movably supported on the support plate, the cassette feed mechanism further including a linear actuator for angularly moving the drive plate to bring the drive rollers into driving engagement with the sides of the copy cassette. The cassette feed mechanism has a shaft mounted on the support plate, the drive plate being mounted on the support plate by the shaft, the power transmitting member having a portion trained around the shaft. The linear actuator comprises a solenoid having a rod engaging an end of the drive plate.

The means for supplying copy cassettes comprises a first support plate, a first cassette feed mechanism mounted on the first support plate, for feeding a copy cassette held in the cassette holder to the means for identifying copy cassettes, a second support plate, and a second cassette feed mechanism mounted on the second support plate, for feeding an identified copy cassette to the image reading apparatus.

The apparatus further comprises a first feed roller for feeding a copy cassette to the cassette holder, and a second feed roller for feeding a copy cassette to the image reading apparatus, the first cassette feed mechanism being substantially aligned with the first feed roller, the second cassette feed mechanism being substantially aligned with the second feed roller. Each of the first and second cassette feed mechanisms comprises a rotary actuator, and drive rollers rotatable by the rotary actuator, for drivingly engaging sides of the copy cassette to feed copy cassette to the means for identifying copy cassettes or the image reading apparatus.

The cassette holder includes a plurality of guide rollers disposed between the steps, for guiding copy cassettes when the copy cassettes are moved onto and off the steps, the first and second feed mechanisms being movable between adjacent ones of the guide rollers into driving engagement with the copy cassette to feed the copy cassette. The first and second feed mechanisms include respective first and second drive plates angularly movably supported on the first and second support plates, respectively, the drive rollers being rotatably mounted on each of the first and second drive plates, the rotary actuators being mounted respectively on the first and second support plates, for rotating the drive rollers, and first and second linear actuators mounted on the first and second support plates, respectively, for angularly moving the first and second drive plates to bring the drive rollers on the first and second drive plates into driving engagement with sides of the copy cassette.

The cassette holder has an uppermost table for placing a copy cassette thereon, further including a cassette inlet for placing a copy cassette therethrough onto the uppermost table.

The apparatus further includes means for defining a first cassette insertion slot for introducing a copy cassette therethrough from the means for supplying copy cassettes, into the image reading apparatus, and a second cassette insertion slot substantially aligned with the first cassette insertion slot, for supplying a copy cassette therethrough to the cassette holder, the means for supplying copy cassettes comprising means for supplying a copy cassette from the cassette holder through the first cassette insertion slot to the image reading apparatus. The apparatus further includes a lid for openably closing the second cassette insertion slot. The apparatus also includes means near the second cassette insertion slot, for detecting a copy cassette which is inserted through the second cassette insertion slot. The apparatus also includes feed rollers disposed near the means for detecting a copy cassette, for feeding the copy cassette inserted through the second cassette insertion slot to the cassette holder. The copy cassettes of the present invention, in which a copy or an original of a photograph taken on a photo film is placed, are generally used in film making devices as a preliminary step in the print plate making process.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
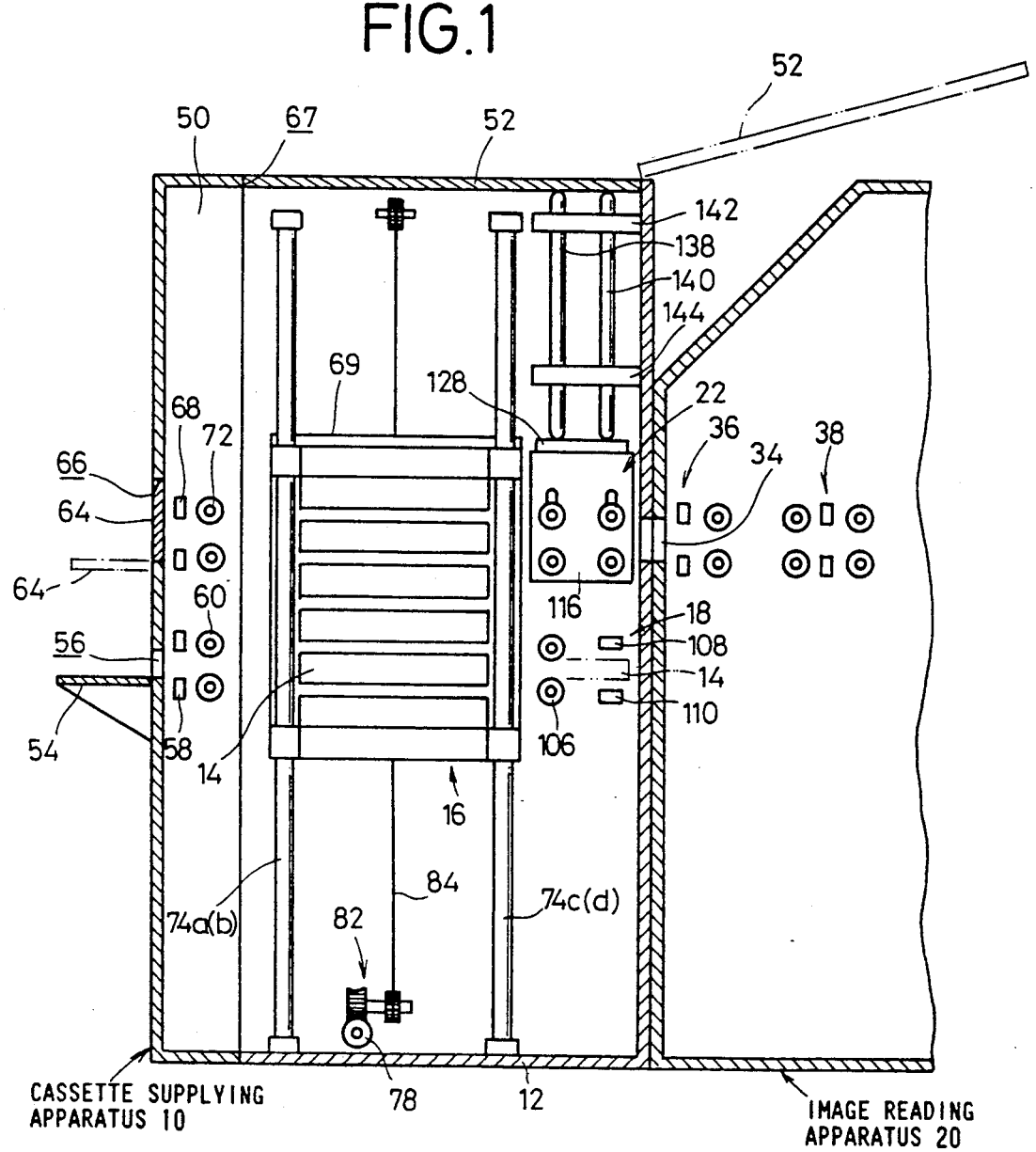
FIG. 1 is a vertical cross-sectional view of a copy cassette supplying apparatus according to the present invention.

FIG. 1 shows a copy cassette supplying apparatus, generally designated by the reference numeral 10, according to the present invention The copy cassette supplying apparatus 10 includes a casing 12 which houses a cassette holder 6 for holding a plurality of copy cassettes 14, a cassette identifying unit 18 for identifying the copy cassettes 14, and a cassette supply unit 22 for supplying one, at a time, of the copy cassettes 14 from the cassette holder 16 to an image reading apparatus 20 that is coupled to the copy cassette supplying apparatus 10.

Figure 2:
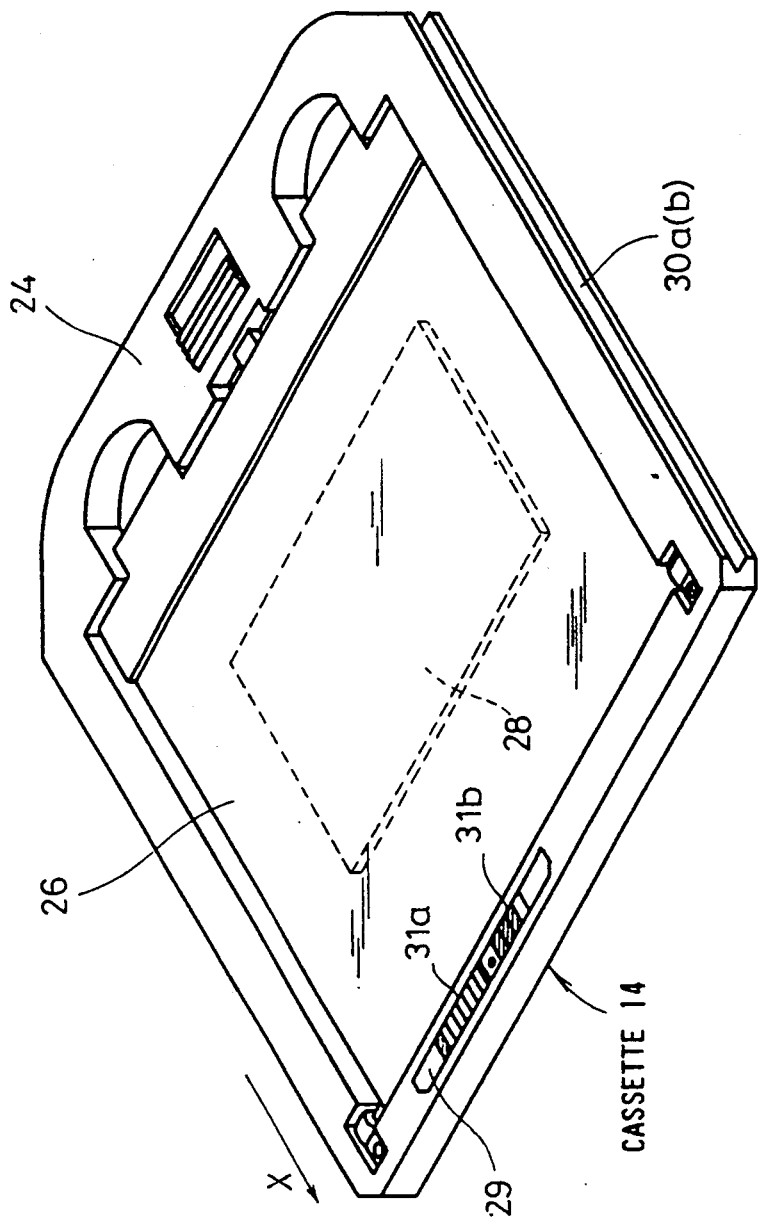
FIG. 2 is a perspective view of a copy cassette which can be loaded in the copy cassette supplying apparatus shown in FIG. 1.

Each of the copy cassettes 14 is of a structure as shown in FIG. 2. The copy cassette 14 has a substantially square frame 24 which holds a pair of spaced support glass panels 26 with a light-transmissive original or copy 28 sandwiched therebetween. The copy 28 is placed between glass panels 26 to give rigidity to the copy 28 so that it can be transferred automatically to the image reading apparatus 20 and to assure a constant quality of printed images by having a flat copy when the image is read. The frame 24 has a pair of V-shaped grooves 30a, 30b defined in opposite edges thereof which are laterally spaced from each other across the direction (indicated by the arrow X) in which the copy cassette 14 is fed. The grooves 30a, 30b extend along the direction X. The frame 24 also has a cassette identification 29 on an upper surface of the leading end thereof with respect to the direction X, the cassette identification 29 serving to identify the copy cassette 14 and the copy 28 held in the copy cassette 14. The cassette identification 29 comprises a combination of light-transmitting regions 31a and light-blocking regions 31b depending on the copy cassette 14 and the copy 28 held therein.

Figure 3:
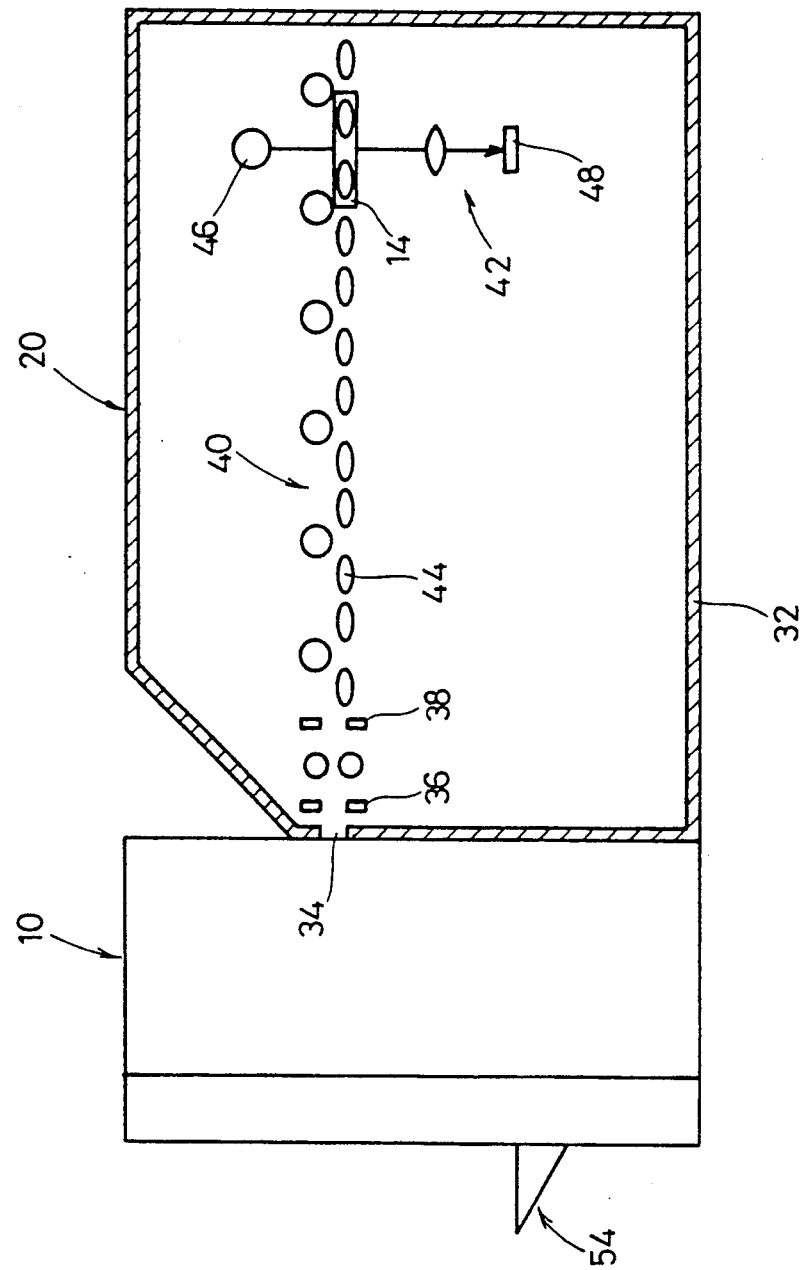
FIG. 3 is a schematic vertical cross-sectional view of an image reading apparatus which is coupled to the copy cassette supplying apparatus shown in FIG. 1.

As shown in FIG. 3, the image reading apparatus 20 has a cassette insertion detector 36 such as a photointerrupter disposed near a cassette insertion slot 34 defined in a casing 32 of the image reading apparatus 20, a cassette identifying unit 38, a feed system 40 for feeding a copy cassette 14 in the image reading apparatus 20, and an image reader 42 for reading image information from the copy 28 held in a copy cassette 14. The cassette insertion detector 36 detects when a copy cassette 14 is inserted into the image reading apparatus 20. The cassette identifying unit 38 identifies an inserted copy cassette 14 and also the copy 28 held in the inserted copy cassette 14. The cassette identifying unit 38 may comprise pairs of light-emitting elements and light-detecting elements. The feed system 40 serves to feed a copy cassette 14 from the cassette insertion slot 34 to the image reader 42. The feed system 40 has guide rollers 44 for rollingly engaging in the grooves 30a, 30b of the copy cassette 14. The image reader 42 comprises a light source 46 and a light detector device 48 such as a CCD or the like. The image information of the copy 28 held in a copy cassette 14 is read by the image reader 42 when light emitted from the light source 46 and transmitted through the copy 28 is detected by the light detector device 48. The copy cassette 14 is returned to the cassette supplying apparatus 10 after the copy 28 is read in the image reading apparatus 20. If the copy 28 was read properly, the copy 28 is removed from the cassette 14 and a new copy is placed into the cassette 14.

The copy cassette supplying apparatus 10 will now be described in detail.

Figure 4:
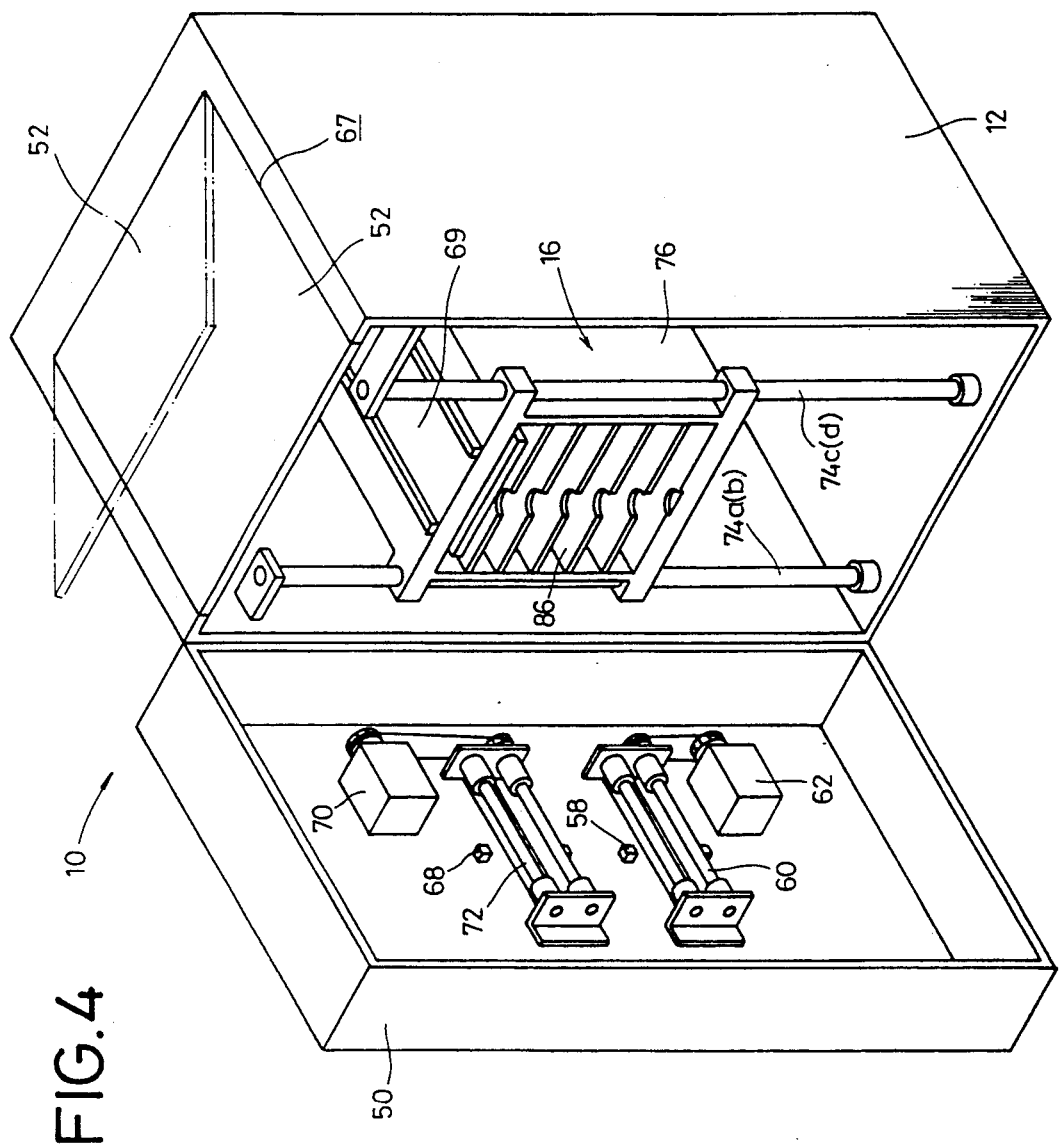
FIG. 4 is a perspective view of the copy cassette supplying apparatus shown in FIG. 1.

As shown in FIG. 4, the casing 12 has a first door 50 which openably closes a front opening in the casing 12 and a second door 52 which openably closes an upper opening in the casing 12. The first door 50 has a cassette insertion tray 54 attached to an outer surface thereof, and a cassette insertion slot 56 defined therein immediately above the cassette insertion tray 54. A cassette insertion detector 58 such as a photointerrupter for detecting insertion of a copy cassette 14 into the cassette insertion slot 56 is mounted on an inner surface of the first door 50 near the cassette insertion slot 56. A pair of vertically spaced feed rollers 60 is also mounted on the inner surface of the first door 50 immediately behind the cassette insertion slot 56. The feed rollers 60 are rotatably by a motor 62 mounted on the inner surface of the first door 50, for feeding an inserted copy cassette 14 into the copy cassette supplying apparatus 10. The first door 50 also has another cassette insertion slot 66 defined therein above the cassette insertion closed by a lid 64. A cassette insertion detector 68 such as a photointerrupter for detecting insertion of a copy cassette 14 into the cassette insertion slot 66 is mounted on the inner surface of the first door 50 near the cassette insertion slot 66. A pair of vertically spaced feed rollers 72 is also mounted on the inner surface of the first door 50 immediately behind the cassette insertion slot 66. The feed rollers 60 are rotatably by a motor 70 mounted on the inner surface of the first door 50, for feeding an inserted copy cassette 14 into the copy cassette supplying apparatus 10.

Copy cassettes 14 can be inserted one by one into the copy cassette supplying apparatus 10 through the cassette insertion slot 56 or 66. A plurality of copy cassettes 14 can also be loaded simultaneously into the copy cassette supplying apparatus 10 while the first door 50 is open. Therefore, copy cassettes 14 can be placed into the copy cassette supplying apparatus in a short period of time.

The upper opening which is normally closed by the second door 52 serves as a cassette inlet 67 through which a copy cassette 14 can be put onto an uppermost table 69 of the cassette holder 16.

Figure 5:
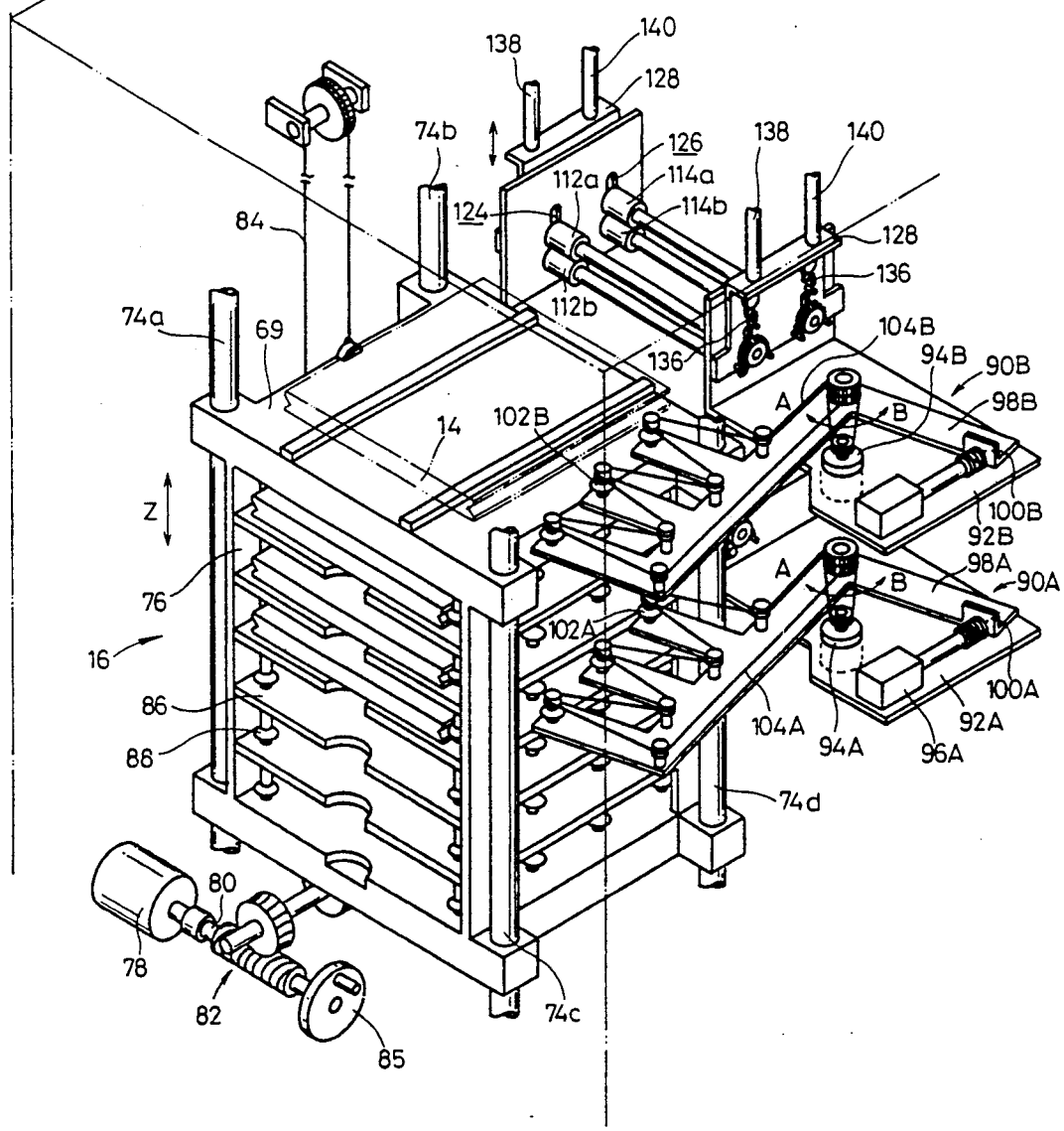
FIG. 5 is a fragmentary perspective view of an internal structure of the cop cassette supplying apparatus shown in FIG. 1.

The cassette holder 16 has a cage 76 vertically movably supported on four guide bars 74a, 74b, 74c, 74d which are vertically disposed in the casing 12. As shown in FIG. 5, the cage 76 is vertically movable in directions indicated by the arrow Z by a chain 84 coupled to a worm gear mechanism 82 which is connected to a drive shaft 80 of a motor 78. The work gear mechanism 82 is associated with a manually rotatable handle wheel 85 for manually moving the cage 76 vertically.

The cage 76 has a plurality of vertically spaced steps 86 which define bins for loading copy cassettes 14 therein. Between the steps 86, there are disposed a plurality of guide rollers 88 for engaging the grooves 30a, 30b of the copy cassettes 14.

Figure 6:
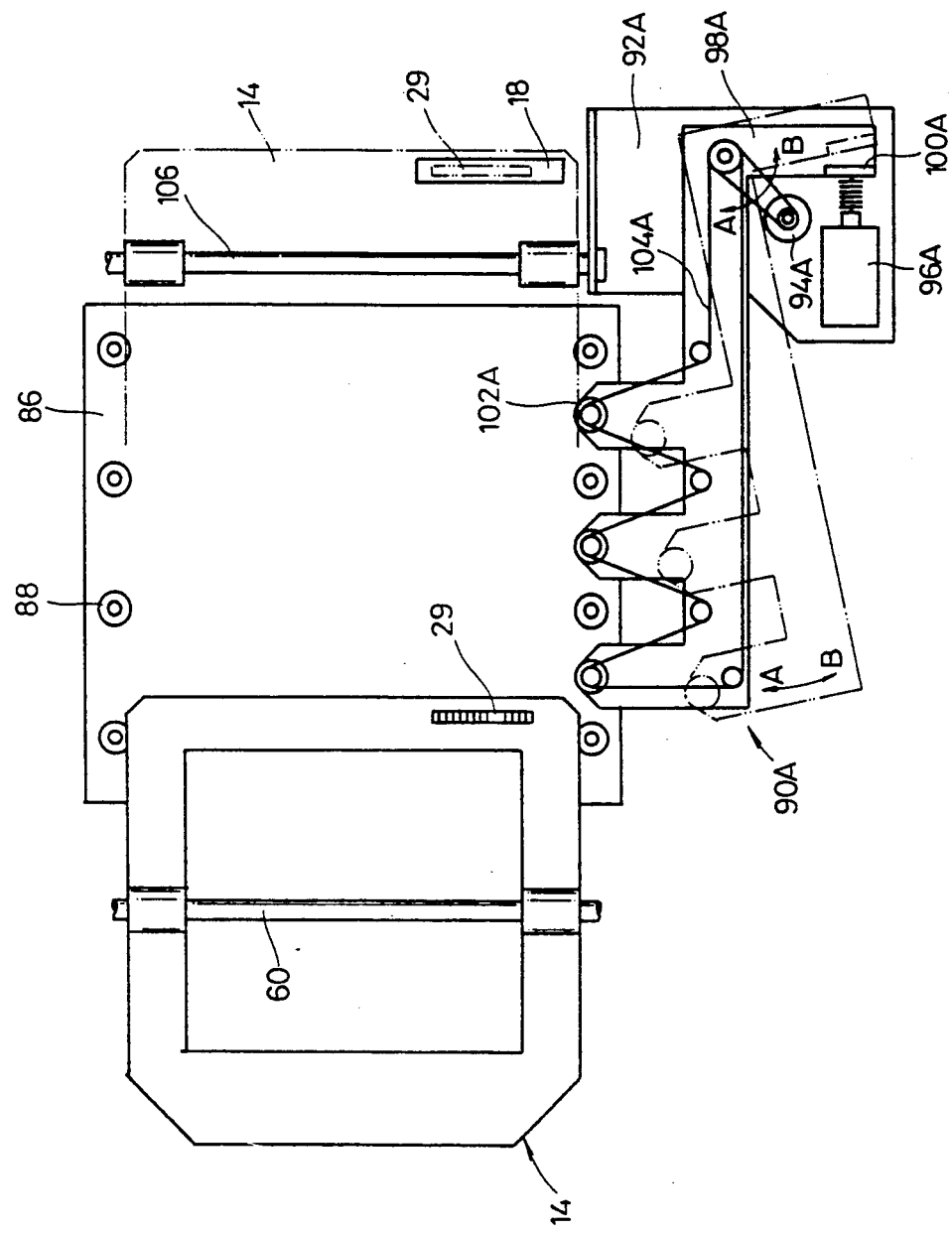
FIGS. 6 and 7 are plan views of cassette feed mechanisms, respectively, in the copy cassette supplying apparatus shown in FIG. 1.

A cassette feed mechanism 90A is positioned laterally of the cage 76 and substantially horizontally aligned with the feed rollers 60 on the first door 50. As shown in FIG. 6, the cassette feed mechanism 90A has a motor 94A and a solenoid 96A which are fixedly mounted on a support plate 92A, and a drive plate 98A angularly movably supported on the support plate 92A by a shaft. The drive plate 98A is of a substantially L-shaped structure and pivotally supported on the support plate 92A at its bent corner. One end of the drive plate 98A is coupled to a rod of the solenoid 96A through a joint 100A vertically mounted on the end of the drive plate 98A. The other end of the drive plate 98A has a plurality of spaced teeth on which respective drive rollers 102A are rotatably supported. The drive rollers 102A are rotatably by the motor 94A through a wire 104a that is trained around the drive rollers 102A and the shaft by which the drive plate 98B is supported. When the solenoid 96A is energized, the drive plate 98A is angularly moved to displace the drive rollers 102A into spaces between the guide rollers 88 between predetermined two of the steps 86 in the cage 76.

A pair of nip rollers 106 and a cassette identifying unit 18 are disposed on the side of the cage 76 remote from the cassette insertion slot 56 in the first door 50. The nip rollers 106 and the cassette identifying unit 18 are substantially horizontally aligned with the cassette insertion slot 56. The cassette identifying unit 18 comprises a plurality of pairs of confronting light-emitting elements 108 and light-detecting elements 110 (see FIG. 1), for reading identification data represented by the cassette identification 29 on a copy cassette 14.

Figure 7:
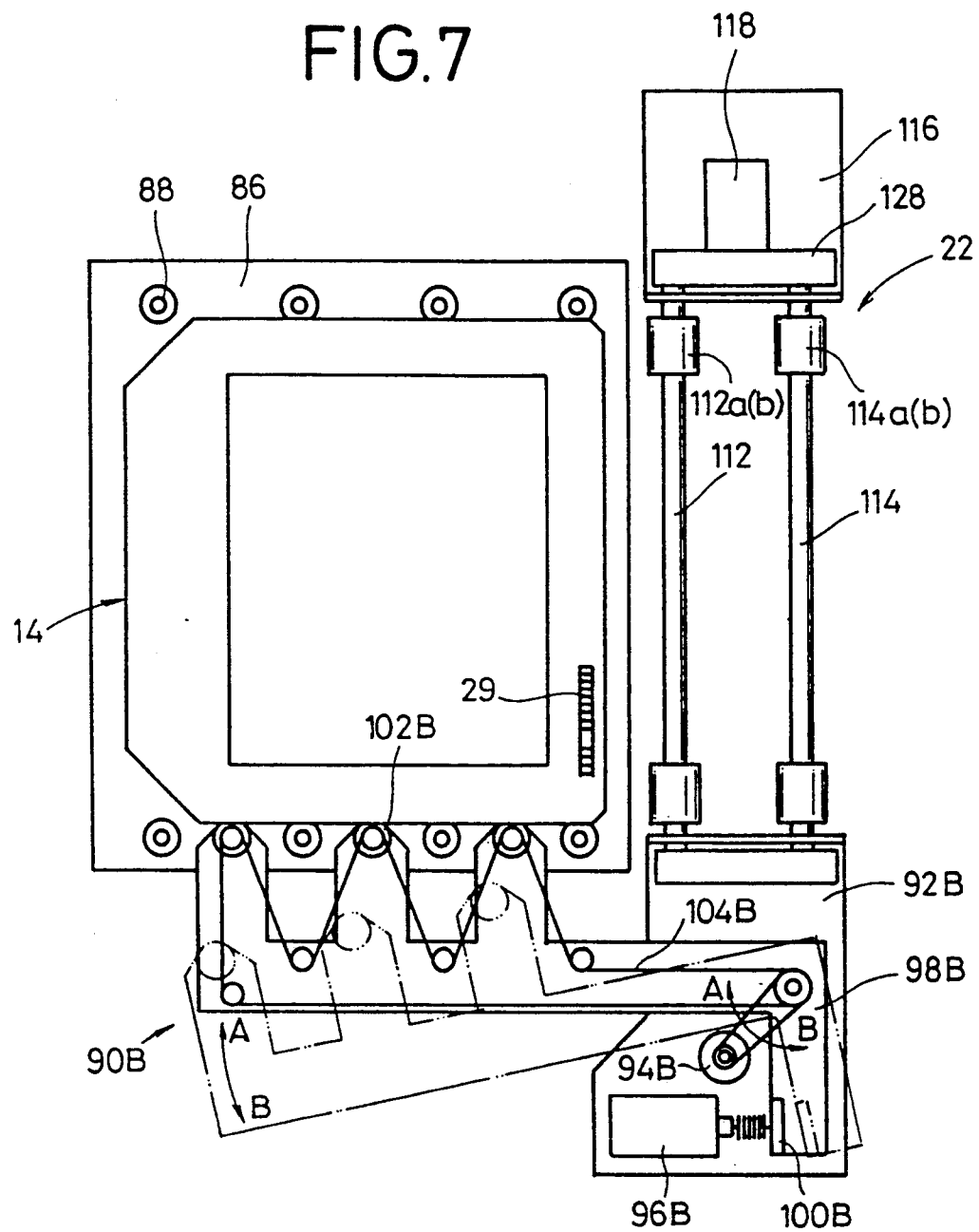

Another cassette feed mechanism 90B is positioned laterally of the cage 76 and substantially horizontally aligned with the feed rollers 72 on the first door 50. The cassette feed mechanism 90B is identical in structure to the cassette feed mechanism 90A, and hence will not be described in detail. Those parts of the cassette feed mechanism 90B which are identical to those of the cassette feed mechanism 90A are denoted by identical reference numerals with a suffix B, as shown in FIGS. 5 and 7.

The cassette supply unit 22 comprises two nip rollers 112a, 112b and two nip rollers 114a, 114b which are disposed in the casing 12 near the image reading apparatus 20 in substantially horizontal alignment with the cassette insertion slot 66 in the first door 50. The nip rollers 112a, 112b and the nip rollers 114a, 114b are rotatable by a motor 118 (FIG. 7) which is mounted on a support plate 116.

Figure 8:
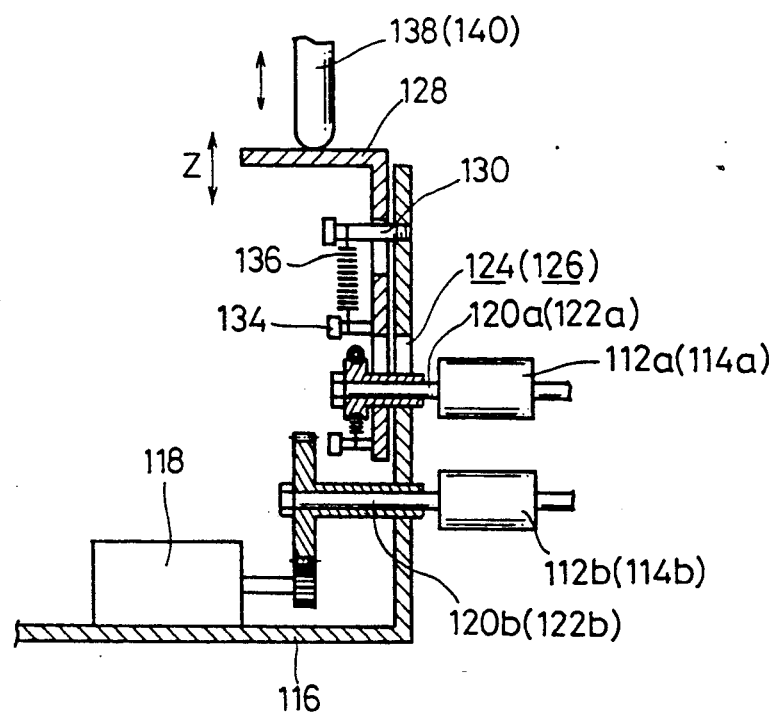
FIG. 8 is a vertical cross-sectional view of an arrangement by which nip rollers are relatively movably supported.

The nip rollers 112a, 112b and the nip rollers 114a, 114b are supported as shown in FIG. 8. More specifically, the nip rollers 112a, 112b and the nip rollers 114a, 114b have respective support shafts 120a, 120b and 122a, 122b which are supported at one end by an upstanding portion of the support plate 116. The ends of the support shafts 120a, 122a of the upper nip rollers 112a, 114a are inserted in respective vertical slots 124, 126 defined in the upstanding portion of the support plate 116. The support shafts 120b, 122b of the lower nip rollers 112b, 114b are operatively coupled to the motor 118.

A vertically movable L-shaped displacement member 128 is disposed parallel to the upstanding portion of the support plate 116. The displacement member 128 is supported on the support plate 116 by a pin 130 secured to the support plate 116 for displacement in the directions indicated by the arrow Z. The ends of the support shafts 120a, 122a which extend through the respective vertical slots 124, 126 are supported on the displacement member 128. The displacement member 128 is normally urged toward an upper presser pin 138 by a coil spring 136 which is coupled between the pin 130 and another pin 136 which is secured to the displacement member 128. As shown in FIG. 1, the presser pin 138 and another presser pin 140 parallel thereto are supported by vertically spaced guide plates 142, 144 in the casing 12, the presser pins 138, 140 being held against an upper surface of the displacement member 128. When the second door 42 is opened, the displacement member 128 is pressed downwardly the second door 42 to lower the displacement member 128, thus bringing the nip rollers 112a, 114a toward the nip rollers 112b, 114b, respectively.

The copy cassette supplying apparatus 10 and the image reading apparatus 20 coupled thereto are basically constructed as described above. Now, operation of the copy cassette supplying apparatus 10 and the image reading apparatus 20 will be described below.

First, a copy cassette 14 with a copy 28 held therein as shown in FIG. 2 is inserted into the copy cassette supplying apparatus 10 through the cassette insertion slot 56 (see FIG. 1). The cassette insertion detector 58 detects the inserted copy cassette 14, whereupon the motor 62 is energized to rotate the feed rollers 60 to load the inserted copy cassette 16 onto a predetermined one of the steps 86 in the cage 76 of the cassette holder 16. The predetermined step 86 in the cage 76 has been positioned such that the empty bin thereabove is located near the feed rollers 60. The loaded copy cassette 14 is held in place by the guide rollers 88 engaging in the grooves 30a, 30b above the predetermined step 86.

When the cop cassette 14 is loaded into a predetermined position on the step 86, the cassette feed mechanism 90A is actuated (see FIGS. 5 and 6). More specifically, the solenoid 96A is energized to turn the drive plate 98A in the direction indicated by the arrow A through the joint 100A, bringing the guide rollers 102A on the drive plate 98A between the steps 86 until the drive rollers 102A engage in the grooves 30a, 30b of the copy cassette 14. Then, the motor 94A is energized to feed the wire 104A to rotate the drive rollers 102A. The copy cassette 14 is now moved to bring its leading end between the light-emitting elements 108 and the light-detecting elements 110 of the cassette identifying unit 18 (see FIG. 1).

The cassette identification 29, in the form of a combination of light-transmitting regions 31a and light-blocking regions 31b, on the leading end of the copy cassette 14 are representative of the type of the copy cassette 4 and the identification mark of the copy 28 held in the copy cassette 14. Light beams which are emitted from the light-emitting elements 108 selectively pas through the cassette identification 29, and then are detected by the light-detecting elements 110. The detected light beams represent the type of the copy cassette 14 and the identification mark of the copy 28. Therefore, the cassette identifying unit 18 reads the necessary information of the copy cassette 14 and the copy 28 held therein. The read information may be recorded in a manner known in the art.

The cassette identifying unit 18 is positioned near the leading end of the copy cassette 14, which leading end has just moved past the step 86. Since the cassette identification 29 is not read when the copy cassette 14 is still moving through the cassette insertion slot 56, but is read when it has reached the cassette identifying unit 18 past the step 86, the cassette identification 29 is stably read by the cassette identifying unit 18. Thus, the necessary information can be read accurately.

After the information of the cassette identification 29 has been read, the copy cassette 14 is moved back into the predetermined position on the tray 86 by the cassette feed mechanism 90A. Thereafter, the drive plate 98A is turned in the direction indicated by the arrow B by the solenoid 96A until the drive plate 98A is fully retracted out of the cage 76.

Then, the motor 78 is energized to cause the worm gear mechanism 82 and the chain 84 to move the cage 86 upwardly in a direction indicated by the arrow Z. The cage 86 is brought to a stop when the copy cassette 14 reaches a vertical position corresponding to the upper cassette feed mechanism 90B. The cassette feed mechanism 90B is then actuated to feed the copy cassette 14 from the cage 86 to the cassette supply unit 22 (see FIGS. 1 and 7). Then, the motor 118 of the cassette supply unit 22 is energized to rotate the nip rollers 112a, 112b and 114a, 114b to supply the copy cassette 14 through the cassette insertion slot 34 into the image reading apparatus 20.

When the supplied copy cassette 14 is detected by the cassette insertion detector 36 in the image reading apparatus 20, the feed system 40 is actuated to feed the copy cassette 14 to the image reader 42. While the copy cassette 14 is being thus fed, the identification information of the copy cassette 14 is read by the cassette identifying unit 38. In the image reader 42, light emitted from the light source 46 passes through the copy 28 held in the copy cassette 14 and is detected by the light-detecting element 48, thereby reading the image information carried by the copy 28.

In the above operation, the copy cassette 14 is loaded through the cassette insertion slot 56 into the copy cassette supplying apparatus 10. The loaded copy cassette 14 is then supplied to the image reading apparatus 20 after it has been vertically displaced a certain distance by the cassette holder 16. Before the copy cassette 14 is supplied to the image reading apparatus 20, a certain period of time is consumed which is required by the operation of the cassette identifying unit 18 to identify the copy cassette 14 and the operation of the cassette holder 16 to feed the copy cassette 14 to the cassette supply unit 22.

The copy cassette supplying apparatus 10 has a quick cassette supply feature for quickly supplying a desired copy cassette to the image reading apparatus 20. More specifically, a copy cassette 14 is inserted into the copy cassette supplying apparatus 10 through the cassette insertion slot 66 above the cassette insertion slot 56.

If there is already a copy cassette 14 held by the cassette holder 16 and another copy cassette 14 is to be supplied quickly to the image reading apparatus 20 while interrupting or overriding the supplying process for the existing copy cassette 14, then the lid 64 is opened as indicated by the imaginary line in FIG. 1. At this time, the bin of the cassette holder 16 which corresponds to the cassette insertion slot 66 has been emptied. The other copy cassette 14 which is inserted from the cassette insertion slot 66 is detected by the cassette insertion detector 68, whereupon the feed rollers 72 are rotated to supply the inserted copy cassette 14 to the cassette holder 16. Upon supply of the copy cassette 14 to the cassette holder 16, the drive plate 98B of the upper cassette feed mechanism 90B is turned in the direction indicated by the arrow A by the solenoid 96B. Then, the motor 94B is energized to rotate the rollers 102B engaging in the grooves 30a, 30b of the copy cassette 14, moving the copy cassette 14 to the cassette supply unit 22. The motor 118 of the cassette supply unit 22 is energized to rotate the nip rollers 112a, 112b and 114a, 114b to supply the copy cassette 14 through the cassette insertion slot 34 into the image reading apparatus 20. In the image reading apparatus 20, the supplied copy cassette 14 is fed to the image reader 42, which then reads the image information from the copy 28 held in the copy cassette 14.

The cassette insertion slot 66 of the copy cassette supplying apparatus 10 is held in horizontal alignment with the cassette insertion slot 34 of the image reading apparatus 20. Therefore, when an additional desired copy plying apparatus 10 directly to the image reading apparatus 20 while interrupting the supplying process for an other copy cassettes which may already exist in the cassette holder 16. If the number of copy cassettes to be supplied is small, they may also quickly be inserted through the cassette insertion slot 66 and supplied from the copy cassette supplying apparatus 10 directly to the image reading apparatus 20.

In the image reading apparatus 20, image processing conditions are sometimes established on the basis of image information which is preliminarily read from a copy 28.

After the image information has preliminarily been read from the copy 28 in the image reader 42, the copy cassette 14 which holds the copy 28 is fed back to the copy cassette supplying apparatus 10 by the feed system, and then delivered onto the cassette insertion tray 54 through the cassette insertion slot 56. The operator of the image reading apparatus 20 then establishes necessary image processing conditions while viewing the copy 28 held in the copy cassette 14 which has returned onto the cassette insertion tray 54. After the image processing conditions have been established, the operator loads the copy cassette 14 again into the copy cassette supplying apparatus 10.

The cassette holder 16 has a plurality of steps 86, and other copy cassettes 14 are normally carried on the respective steps 86. However, it is necessary to supply the copy cassette 14, with respect to which the image processing conditions have already been established, among other copy cassettes 14, to the image reading apparatus 20.

The copy cassette supplying apparatus 10 detects, through the cassette identifying unit 18, and stores the information indicative of which copy cassette 14 is loaded onto which step 86 and when such copy cassette 14 is loaded. When a certain copy cassette 14, with respect to which the image processing conditions have already been established, is indicated by the image reading apparatus 20, the copy cassette supplying apparatus 10 can immediately determine the step on which the indicated copy cassette 14 is placed, based on the stored information, and supply the indicated copy cassette 14 to the image reading apparatus 20. Even if a plurality of copy cassettes 14 are handled, therefore, a desired copy cassette 14 can accurately and quickly be sup plied to the image reading apparatus 20 for reading image information from the copy 28.

The copy cassette supplying apparatus 10 can automatically supply a copy cassette 14 to the image reading apparatus 20. If the copy cassette supplying apparatus 10 is broken down, then a copy cassette 14 cannot automatically supplied through the cassette insertion slots 56 or 66. In such a case, a copy cassette 14 can manually be inserted through the cassette inlet 67 and supplied to the image reading apparatus 20.

More specifically, in the event of a failure of the copy cassette supplying apparatus 10, the operator opens the second door 52, and manually places a copy cassette 14 on the uppermost table 69 of the cassette holder 16. At this time, since the second door 52 is lifted, the nip rollers 112a, 112b are upwardly displaced away from the nip rollers 112b, 114b (see FIG. 8). More specifically, when the second door 52 is closed, the upper nip rollers 112a, 114a are displaced near the lower nip rollers 112b, 114b by the displacement member 128 pressed downwardly by the presser pins 138, 140. However, when the second door 52 is opened, the displacement member 12 is not forcibly pressed by the presser pins 138, 140, but is displaced in the upward direction indicated by the arrow Z under the bias of the spring 136. Therefore, the upper nip rollers 112a, 114a are elevated away from the lower nip rollers 112b, 114b.

Figure 9:
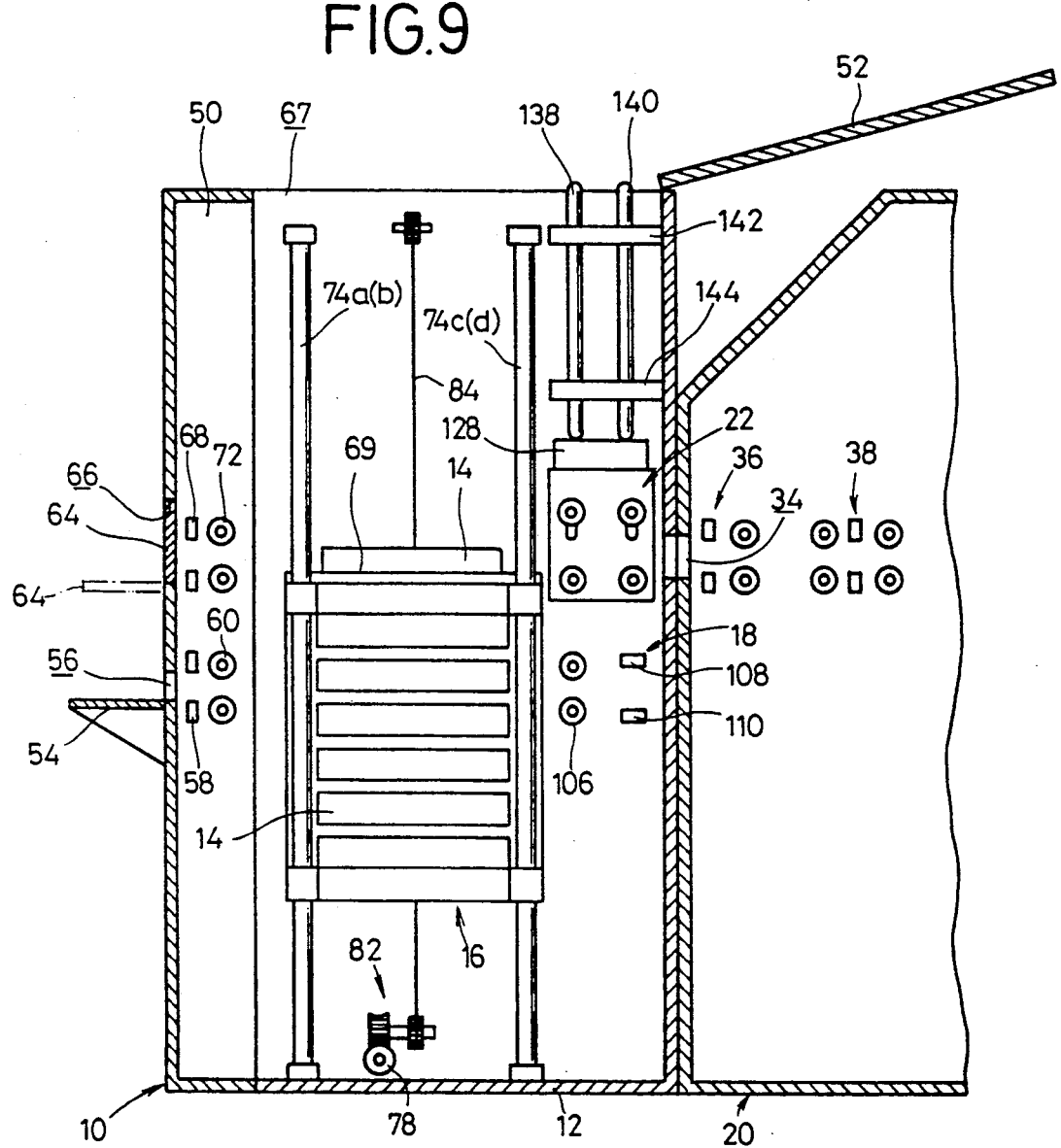
FIG. 9 is a view similar to FIG. 1, showing a cassette holder lowered.

After the copy cassette 14 is placed on the table 69 through the cassette inlet 67, the handle wheel 85 is manually turned to lower the cassette holder 16 (see FIGS. 5 and 9). Access to the handle wheel 85 can easily be gained by opening the first door 50. The cassette holder 16 is lowered until the table 69 is horizontally aligned with the cassette supply unit 22. Then, the copy cassette 14 is supplied from the table 69 through the nip rollers 112a, 112b and 114a, 114b to the image reading apparatus 20. In the image reading apparatus 20, the supplied copy cassette 14 is detected by the cassette insertion detector 36, and then supplied to the image reader 42 for reading image information from the copy 28.

Since a copy cassette 14 can manually be supplied through the cassette inlet 67 to the image reading apparatus 20, a desired copy cassette 14 can quickly be supplied to the image reading apparatus 20 even in the event of a failure of the copy cassette supplying apparatus 10. Furthermore, a desired copy cassette 14 may also be supplied quickly through the cassette inlet 67 to the image reading apparatus 20 while interrupting or overriding the supply process for any other existing copy cassettes 14 in the cassette holder 16.

The copy cassette supplying apparatus 10 according to the present invention offers the following advantages:

When a copy cassette is to be loaded onto a step of the cassette holder, the copy cassette is identified by the cassette identifying unit. To supply a desired copy cassette from the cassette holder to the image reading apparatus, the step which carries the desired copy cassette that has been identified by the cassette identifying unit is vertically moved to a position corresponding to the cassette supply unit, and then the copy cassette is supplied to the image reading apparatus by the cassette supply unit.

Therefore, the image reading apparatus can immediately start reading the image information from the copy held in the desired copy cassette supplied from the copy cassette supplying apparatus.

The cassette holder which has a plurality of steps for carrying respective copy cassettes has an uppermost table which receives a manually loaded copy cassette that is to be supplied to the image reading apparatus. Even in the event of a failure of the copy cassette supplying apparatus, the copy cassette placed on the uppermost table of the cassette holder can quickly be supplied to the image reading apparatus. In addition, any desired copy cassette can be supplied from the uppermost table to the image reading apparatus while interrupting or overriding the supply process for any other copy cassettes which are carried on the steps of the cassette holder. Therefore, even if a large number of copy cassettes are handled, a desired additional copy cassette may be supplied to the image reading apparatus while overriding the other existing copy cassettes.

Other advantages of the copy cassette supplying apparatus according to the present invention are as follows: A copy cassette which holds a copy to be read is inserted through the cassette insertion slot and placed onto a step of the cassette holder. Then, the copy cassette is supplied from the step to the image reading apparatus through the cassette insertion slot which corresponds in vertical position to the step. Since a copy cassette can be fed to the cassette supply unit without moving the cassette supply unit, any desired copy cassette can quickly be supplied to the image reading apparatus while interrupting the supply process for other existing copy cassettes, for example. If the number of copy cassettes to be handled is small, the copy cassettes can quickly be supplied to the image reading apparatus.

Although a certain preferred embodiment has been shown and described, it should be understood that many changes and modifications may be made therein without departing from the scope of the appended claims.

What is claimed is:

1. An apparatus for supplying a copy cassette which holds a copy to be read to an image reading apparatus, comprising:
    a cassette holder having an array of steps for holding copy cassettes thereon, said cassette holder being movable in a direction along said array of steps;
    means for identifying copy cassettes to be carried on said steps; and
    means for supplying copy cassettes held on said steps of said cassette holder to the image reading apparatus by laterally transferring said copy cassette from said steps to a cassette insertion slot of said image reading apparatus,
    wherein said means for supplying copy cassettes comprises a first support plate, a first cassette feed mechanism mounted on said first support plate, for feeding a copy cassette held in said cassette holder to said means for identifying copy cassettes, a second support plate, and a second cassette feed mechanism mounted on said second support plate, for feeding an identified copy cassette to the image reading apparatus.

2. An apparatus according to claim 1, wherein said cassette holder comprises an actuator, at least one guide bar, and a cage operatively coupled to said actuator and movable along said guide bar in response to operation of said actuator, said steps being mounted in said cage.

3. An apparatus according to claim 2, wherein said actuator comprises a rotary actuator, a warm near mechanism operatively coupled to said rotary actuator, and a chain connected between said worm gear mechanism and said cage.

4. An apparatus according to claim 1, wherein said cassette holder includes a plurality of guide rollers disposed between said steps, for guiding copy cassettes when the copy cassettes are moved onto and off said steps, said guide rollers being spaced in a direction in which the copy cassettes are moved onto and off said steps.

5. An apparatus according to claim 1, further comprising a first feed roller for feeding a copy cassette to said cassette holder, and a second feed roller for feeding a copy cassette to the image reading apparatus, said first cassette feed mechanism being substantially aligned with said first feed roller, said second cassette feed mechanism being substantially aligned with said second feed roller.

6. An apparatus according to claim 1, wherein each of said first and second cassette feed mechanisms comprises a rotary actuator, and drive rollers rotatable by said rotary actuator, for drivingly engaging sides of the copy cassette to feed copy cassette to said means for identifying copy cassettes or the image reading apparatus.

7. An apparatus according to claim 6, wherein said cassette holder includes a plurality of guide rollers disposed between said steps, for guiding copy cassettes when the copy cassettes are moved onto and off said steps, said first and second feed mechanisms being movable between adjacent ones of said guide rollers into driving engagement with the copy cassette to feed the copy cassette.

8. An apparatus according to claim 7, wherein said first and second feed mechanisms include respective first and second drive plates angularly movably supported on said first and second support plates, respectively, said drive rollers being rotatably mounted on each of said first and second drive plates, said rotary actuators being mounted respectively on said first and second support plates, for rotating said drive rollers, and first and second linear actuators mounted on said first and second support plates, respectively, for angularly moving said first and second drive plates to bring the drive rollers on said first and second drive plates into driving engagement with sides of the copy cassette.

9. An apparatus according to claim 1, wherein said cassette holder has an uppermost table for pacing a copy cassette thereon, further including a cassette inlet for placing a copy cassette therethrough onto said uppermost table.

10. An apparatus according to claim 1, further including means for defining a first cassette insertion slot for introducing a copy cassette therethrough from said means for supplying copy cassettes, into the image reading apparatus, and a second cassette insertion slot substantially aligned with said first cassette insertion slot, for supplying a copy cassette therethrough to said cassette holder, said means for supplying copy cassettes comprising means for supplying a copy cassette from said cassette holder through said first cassette insertion slot to the image reading apparatus.

11. An apparatus according to claim 10, further including a lid for openably closing said second cassette insertion slot.

12. An apparatus according to claim 10, further including means near said second cassette insertion slot, for detecting a copy cassette which is inserted through said second cassette insertion slot.

13. An apparatus according to claim 12, further including feed rollers disposed near said means for detecting a copy cassette, for feeding the copy cassette inserted through said second cassette insertion slot to said cassette holder.

14. An apparatus for supplying a copy cassette which holds a copy to be read to an image reading apparatus, comprising:
a cassette holder having an array of steps for holding copy cassettes thereon, said cassette holder being movable in a direction along said array of steps;
means for identifying copy cassettes to be carried on said steps; and
means for supplying copy cassettes held on said steps of said cassette holder to the image reading apparatus by laterally transferring said copy cassette from said steps to a cassette insertion slot of said image reading apparatus,
wherein said means for supplying copy cassettes comprises a support plate, and a cassette feed mechanism mounted on said support plate, for moving into said cassette holder to feed a copy cassette held in said cassette holder to said means for identifying copy cassettes and the image reading apparatus.

15. An apparatus according to claim 14, wherein said cassette feed mechanism comprises a rotary actuator, and a plurality of spaced drive rollers rotatable by said rotary actuator, for drivingly engaging sides of the copy cassette to feed the copy cassette to said means for identifying copy cassettes and the image reading apparatus.

16. An apparatus according to claim 15, wherein said cassette holder includes a plurality of guide rollers disposed between said steps, for guiding copy cassettes when the copy cassettes are moved onto and off said steps, said guide rollers being spaced in a direction in which the copy cassettes are moved onto and off said steps, said drive rollers being movable between adjacent ones of said guide rollers into driving engagement with the sides of the copy cassette.

17. An apparatus according to claim 14, wherein said cassette feed mechanism comprises a rotary actuator, a drive plate, a plurality of spaced drive rollers rotatably mounted on said drive plate and rotatable by said rotary actuator, for drivingly engaging sides of the copy cassette and feeding the copy cassette to the image reading apparatus, and a power transmitting member operatively coupled between said rotary actuator and said drive rollers.

18. An apparatus according to claim 17, wherein said drive plate is angularly movably supported on said support plate, said cassette feed mechanism further including a linear actuator for angularly moving said drive plate to bring said drive rollers into driving engagement with the sides of the copy cassette.

19. An apparatus according to claim 18, wherein said cassette feed mechanism has a shaft mounted on said support plate, said drive plate being mounted on said support plate by said shaft, said power transmitting member having a portion trained around said shaft.

20. An apparatus according to claim 18, wherein said linear actuator comprises a solenoid having a rod engaging an end of said drive plate. 56, the cassette insertion slot 66 being normally

* * * * *